(12) United States Patent
Wakeley et al.

(10) Patent No.: US 6,477,171 B1
(45) Date of Patent: Nov. 5, 2002

(54) METHOD AND SYSTEM FOR NEGOTIATION OF THE HIGHEST COMMON LINK RATE AMONG NODES OF A FIBRE CHANNEL ARBITRATED LOOP

(75) Inventors: Matthew Paul Wakeley, Roseville, CA (US); George McDavid, Orangelvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/452,618

(22) Filed: Dec. 1, 1999

(51) Int. Cl.$^7$ .............................. H04L 12/28; H04J 3/06
(52) U.S. Cl. ..................... 370/404; 370/503; 714/798
(58) Field of Search ................... 714/4, 798; 370/241, 370/503, FOR 169, 403, 404, 405, 409, 222, 223, 224, 468; 340/825.01

(56) References Cited

U.S. PATENT DOCUMENTS 5,596,575 A * 1/1997 Yang et al. ................. 370/468
6,198,727 B1 * 3/2001 Wakeley et al. ............ 370/247

OTHER PUBLICATIONS

IEEE Standard 802.3u Section 28, Published 1995.*

* cited by examiner

*Primary Examiner*—Albert DeCady
*Assistant Examiner*—Matt Dooley

(57) ABSTRACT

A method and system for automatic negotiation of maximal shared data transmission and reception rates by fibre channel nodes in a fibre channel arbitrated loop. An auto-speed-negotiation function is included in the fibre channel arbitrated loop initialization procedure. A fibre channel node undergoing initialization turns off its transmitter in order to elicit a loss of synchronization condition in the next fibre channel node of the arbitrated loop. Upon detection of loss of synchronization, each subsequent fibre channel arbitrated loop node invokes the auto-speed-negotiation function. The fibre channel node then turns its transmitter back on at the highest possible data transmission rate, sets the data reception rate of the fibre channel node's receiver to the lowest possible data reception rate, and then waits to detect word synchronization by the receiver. If word synchronization is not detected within a reasonable period of time, the fibre channel node changes the data reception rate of the fibre channel node's receiver and again waits to detect word synchronization. Once word synchronization is detected, the fibre channel node again invokes the auto-speed-negotiation function if its current data transmission rate is not equal to its current data reception rate after setting its current data transmission rate equal to its current data reception rate.

10 Claims, 3 Drawing Sheets

METHOD AND SYSTEM FOR NEGOTIATION OF THE HIGHEST COMMON LINK RATE AMONG NODES OF A FIBRE CHANNEL ARBITRATED LOOP

TECHNICAL FIELD

The present invention relates to initialization of fibre channel arbitrated loops and, in particular, to a method and system for automatically determining the highest common transmit and receive rates for all the nodes participating in the fibre channel arbitrated loop.

BACKGROUND OF THE INVENTION

The fibre channel ("FC") is an architecture and a hierarchical set of protocols that define a data communications network for interconnecting a number of different computers and peripheral devices. The FC supports a variety of upper-level protocols, including the small computer systems interface ("SCSI") protocol. A computer or peripheral device is linked to the network through an FC port and copper wires or optical fibres. An FC port includes a transceiver and an interface controller. The computer peripheral device in which an FC port is contained is called a "host," and the combination of an FC port and a host is called an "FC node." An FC port exchanges data with a host via a local data bus, such as a peripheral computer interface ("PCI") bus. The interface controller controls lower-level protocol exchanges between the fibre channel and the computer or peripheral device in which the FC port resides.

An interface controller within an FC port serves essentially as a transducer between serial receiver and transmitter components of the FC port and the host processor of the FC node in which the FC port is contained. On the input side, the interface controller is concerned with assembling serially-encoded data received from the receiver component into ordered sets of bytes, assembling the ordered sets of bytes into FC primitives and FC frames, performing internal state transitions in order to conform to lower-level FC protocols, and passing FC frames, along with status information, to the host processor within the context of larger collections of FC frames, called FC sequences and FC exchanges. On the output side, the interface controller accepts host memory buffer references and control information from the host processor and transforms them into FC frames within the context of FC sequences and FC exchanges, providing the FC frames to the transmitter component of the FC port for serial transmission to the FC, and transmits FC primitives in response to received FC primitives and state transitions in order to conform to lower-level FC protocols.

FC nodes can be interconnected by the FC in a number of different topologies. The present invention relates to the FC arbitrated loop topology in which FC nodes are linked together in a continuous loop, with the transmitter of a first FC node linked to the receiver of the next FC node in the loop and the receiver of the first FC node linked to the transmitter of the previous FC node in the arbitrated loop. FC primitives and FC frames travel in a single direction through the arbitrated loop from a transmitting FC node to a receiving FC node, passing through intervening FC nodes.

FC nodes may transmit and receive data through the FC at different rates. It is desirable for FC nodes, upon power up and initialization, to automatically determine the highest common data transmission and reception rate among all the nodes of the FC arbitrated loop in order to maximize data transmission rates through the FC.

The ethernet is a different type of communications network medium that features parallel signal transmission through a bus-like data transfer medium interconnecting ethernet nodes. The Institute of Electrical and Electronics Engineers ("IEEE") ethernet standard (802.3u Clause 28) describes an auto-negotiation function that allows an ethernet node to advertise any enhanced modes of operation that it supports to a second ethernet node and to detect similar enhanced operational nodes advertised via the auto-negotiation function by the second ethernet node. This auto-negotiation function allows two ethernet devices that share a link segment to automatically configure themselves to take advantage of the maximum shared operational modes. This auto-negotiation function is performed using a modified 10 BASE-T link integrity test pulse sequence that is a feature of the lowest, hardware-implemented protocol levels of an ethernet node, thereby avoiding introduction of specialized auto-negotiation packets and higher-level protocol overhead to ethernet nodes. This type of auto-negotiation function depends on the existence of a point-to-point interconnection between the two communicating nodes, so that the two nodes can exchange information about their enhanced operational modes. Because the negotiation occurs at the lowest protocol levels, the negotiation cannot operate through intervening nodes, such as the intervening nodes of a fibre channel arbitrated loop, without adding enormous complexity to the communications port logic, normally implemented in hardware. Thus, although an auto-negotiation speed function similar to the auto-negotiation function supported by the IEEE ethernet standard would be desirable for FC arbitrated loops, no currently-available FC arbitrated loop implementation supports such an auto-negotiation speed function at the lowest-protocol levels that would allow the auto-negotiation speed function to be implemented without introducing extensive changes to higher-level FC protocols.

SUMMARY OF THE INVENTION

The present invention provides a method and system for automatic data transmission and reception rate negotiation among the FC nodes of an FC arbitrated loop during FC arbitrated loop initialization. An auto-speed-negotiation function is inserted into the interface controller initialization logic of an FC port. In order to begin auto-speed negotiation, an FC node turns off the FC node's transmitter for a first period of time and then reactivates the transmitter at the highest possible data transmission rate supported by the FC node's transceiver. Next, the FC node sets the FC node's receiver to receive data at the receiver's lowest data reception rate. The FC node then waits for the receiver to detect word synchronization. If word synchronization is not achieved in a reasonable period of time, the FC node changes the receiver's data reception rate and again waits for detection of word synchronization. In one embodiment of the present invention, the FC node waits for 1 millisecond for word synchronization before adjusting the data reception rate. The receiver rate continues to be adjusted in this manner until word synchronization is achieved. Following detection of word synchronization, the FC node determines whether its current data transmission rate is equal to its current data reception rate. If so, then the auto-speed-negotiation function is finished, and the FC node carries out the remaining steps of FC arbitrated loop initialization. If the data transmission rate is not currently equal to the negotiated receiver rate, the FC node turns off its transmitter, waits for a period of time, and then reactivates the transmitter at a data transmission rate equal to the receiver's current data reception rate. The auto-speed-negotiation function is invoked during the initialization routine executed by FC nodes upon power up, detection of loss of signal, or detection of loss of word synchronization. Because the auto-speed-negotiation function is inserted in one of the beginning phases of fibre channel arbitrated loop initialization, and because no other changes to the relatively complex FC node state machine and state transitions are necessary to implement the auto-speed-negotiation function, complex changes to higher level FC protocols are avoided.

DETAILED DESCRIPTION OF THE INVENTION

The Fibre Channel ("FC") is defined by, and described in, a number of ANSI Standards documents, including: (1) Fibre Channel Physical and Signaling Interface ("FC-PH"), ANSI X3.230-1994, ("FC-PH-2), ANSI X3.297-1997; (2) Fibre Channel—Arbitrated Loop ("FC-AL-2"), ANSI X3.272-1996; (3) Fibre Channel—Private Loop SCSI Direct Attached ("FC-PLDA"); (4) Fibre Channel—Fabric Loop Attachment ("FC-FLA"); (5) Fibre Channel Protocol for SCSI ("FCP"); (6) Fibre Channel Fabric Requirements ("FC-FG"), ANSI X3.289:1996; and (7) Fibre Channel 10-Bit Interface. These standards documents are under frequent revision. Additional Fibre Channel System Initiative ("FCSI") standards documents include: (1) Gigabaud Link Module Family ("GLM"), FCSI-301; (2) Common FC-PH Feature Sets Profiles, FCSI-101; and (3) SCSI Profile, FCSI-201. These documents may be found at the world wide web Internet page having the following address:

http://www.fibrechannel.com

The following description of the FC is meant to introduce and summarize certain of the information contained in these documents in order to facilitate discussion of the present invention. If a more detailed discussion of any of the topics introduced in the following description is desired, the above-mentioned documents may be consulted.

Figure 1:
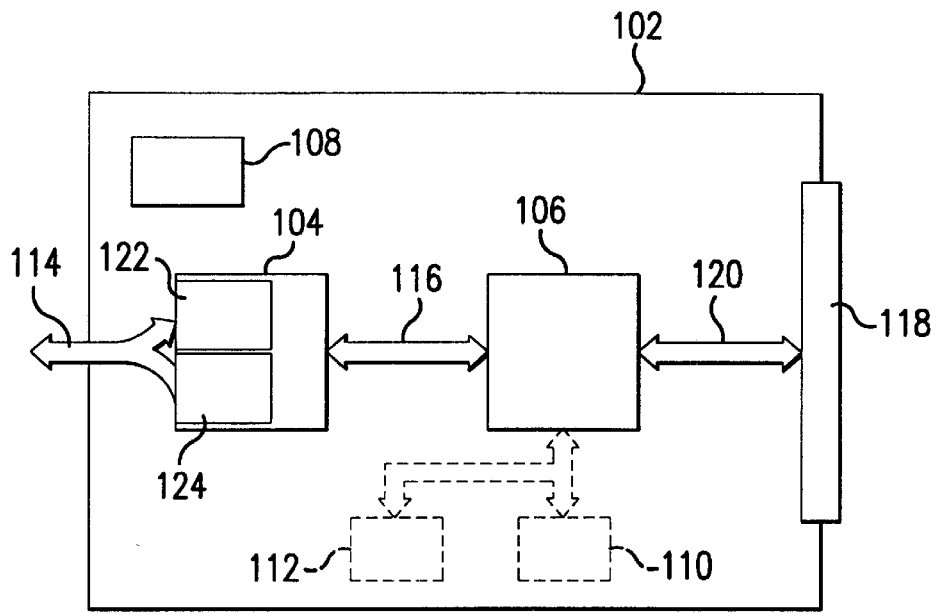
FIG. 1 is a block diagram of a typical FC port.

The FC is an architecture and protocol for data communications between FC nodes, generally computers, workstations, peripheral devices, and arrays or collections of peripheral devices, such as disk arrays, interconnected by one or more communications media. Communications media include shielded twisted pair connections, coaxial cable, and optical fibers. An FC node is connected to a communications medium via at least one FC port and FC link. An FC port is an FC host adapter or FC controller that shares a register and memory interface with the processing components of the FC node and that implements, in hardware and firmware, the lower levels of the FC protocol. FIG. 1 is a block diagram of a typical FC port adapter board. The FC port 102 includes a transceiver chip 104 and an interface controller chip 106. The FC port additionally contains a clock 108 for synchronizing transceiver, interface controller, and operations. An FC port may optionally contain a flash ROM 110 and a synchronous static RAM 112 for storing local data and storing firmware instructions. The transceiver 104 is interconnected to the fibre channel through a fibre channel link 114. The transceiver chip 104 is interconnected with the interface controller chip via a 10-bit interface bus 116. The interface controller chip is interconnected with a backplane connector 118 via a 32-bit/64-bit PCI interface 120. The FC port interconnects with a host processor via a host data bus connected to the backplane connector 118. The transceiver chip includes a serial receiver component 122 and a serial transmitter component 124. The serial receiver and transmitter components are coupled to the FC via the link 114 that comprises electrical wires or optical strands. The FC node generally exchanges data and control information with the FC port using shared data structures in shared memory and using control registers in the FC port.

In the following discussion, "FC" is used as an adjective to refer to the general Fibre Channel architecture and protocol, and is used as a noun to refer to an instance of a Fibre Channel communications medium. Thus, an FC (architecture and protocol) port may receive an FC (architecture and protocol) sequence from the FC (communications medium).

Figure 2:
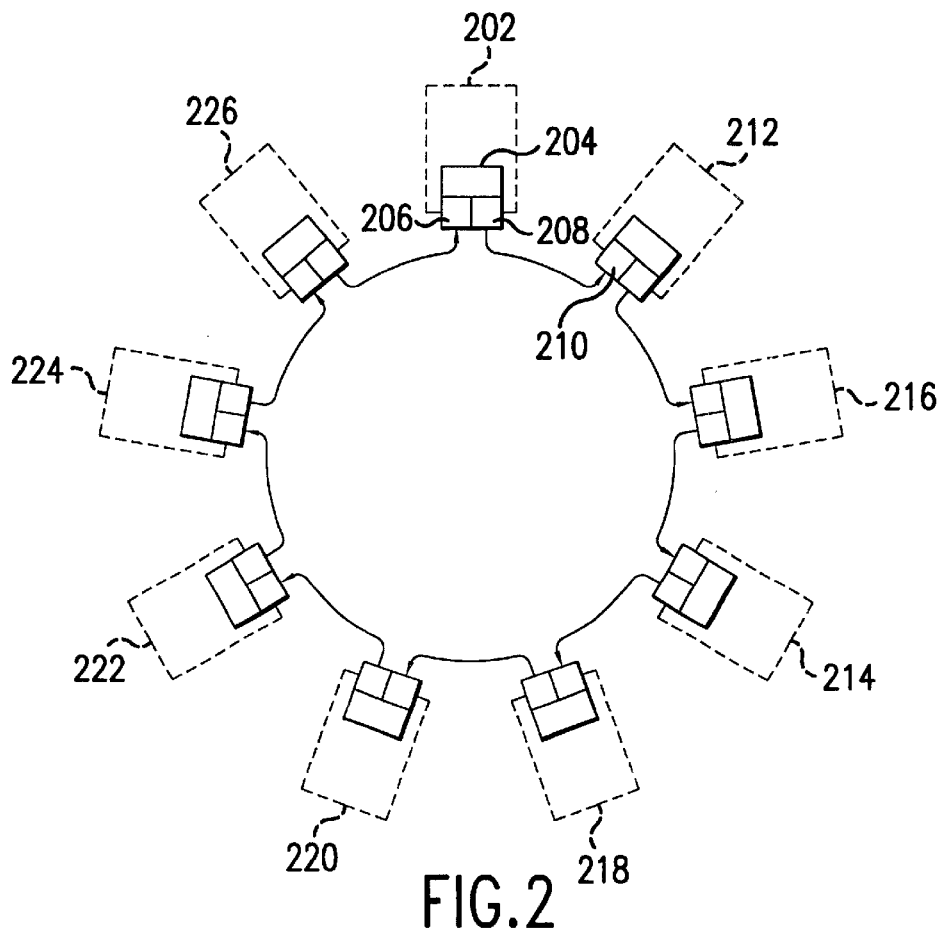
FIG. 2 graphically illustrates an example FC arbitrated loop having nine FC nodes.

The FC architecture and protocol support a number of different types of interconnection topologies. The present invention relates to a particular type of topology called the "FC arbitrated loop topology." FIG. 2 graphically illustrates an example FC arbitrated loop having nine FC nodes. Each FC node, for example FC node 202, includes an FC port, for example FC port 204 within FC node 202, that has a receiver component 206 and a transmitter component 208. The transmitter component of each FC node, such as FC node 202, is connected to the receiver component of the next FC node in the FC arbitrated loop, in the current example receiver component 210 of FC node 212. In the FC arbitrated loop shown in FIG. 2, FC primitives and FC frames are transmitted, in a clockwise direction around the loop. At any given time, the FC arbitrated loop supports a single logical interconnection between two FC nodes. For example, with reference to FIG. 2, FC node 202 may open a connection with FC node 214 and, once connected, FC nodes 202 and 214 can exchange data through the arbitrated loop. When FC node 202 transmits data to FC node 214, the data passes through the transceivers of FC nodes 212 and 216. When FC node 214 transmits data to FC node 202, the data passes through the transceivers of FC nodes 218, 220, 222, 224, and 226.

In the FC arbitrated loop topology, nodes contend for, or arbitrate for, control of the arbitrated loop. In general, the node with the lowest port address obtains control in the case that more than one node is contending for control. A fairness algorithm may be implemented by FC nodes to ensure that all FC nodes eventually receive control within a reasonable amount of time. When an FC node has acquired control of the loop, the FC node can open a channel to any other FC node within the arbitrated loop. In a half duplex channel, one FC node transmits and the other FC node receives data. In a full duplex channel, data may be transmitted by a first FC node and received by a second FC node at the same time that data is transmitted by the second FC node and received by the first FC node.

The FC is a serial communications medium. Data is transferred one bit at a time at extremely high transfer rates. At the lowest conceptual level, the data can be considered to be a stream of data bits. The smallest unit of data, or grouping of data bits, supported by an FC network is a 10-bit character that is decoded by FC port as an 8-bit character. At a next conceptual level, FC primitives are composed of 10-bit characters or bytes. Certain FC primitives are employed to carry control information exchanged between FC ports, and other FC primitives may be transmitted as fill, or idle, characters during periods when information-containing FC primitives or higher-level-protocol data constructs are not being transmitted. The next level of data organization, a fundamental level with regard to the FC protocol, is a frame. A frame may be composed of between 36 and 2,148 bytes of data, depending on the nature of the data included in the frame. The FC protocol specifies higher organizational levels called sequences and exchanges. A sequence is composed of one or more frames, and an exchange is composed of one or more sequences.

The FC is a full duplex data transmission medium. Frames and sequences can be simultaneously passed in both directions between an originator, or initiator, and a responder, or target. An exchange comprises all sequences, and frames within the sequences, exchanged between an originator and a responder during a single I/O transaction, such as a read I/O transaction or a write I/O transaction.

An FC frame header contains fields that specify the source and destination addresses of the FC frame, called the "S_ID" and "D_ID" fields, respectively. Both the D_ID and the S_ID are 3-byte quantities that specify a three-part address for a particular FC port. These three parts include specification of an FC domain, an FC node address, and an FC port within the FC node. In an FC arbitrated loop, each of the 127 possible active FC nodes acquires, during loop initialization, an arbitrated loop physical address ("AL PA"). The AL_PA is a 1-byte quantity that corresponds to the FC port specification within the D_ID and S_ID of the FC frame header. Because there are at most 127 active FC nodes interconnected by an arbitrated loop topology, the single byte AL_PA is sufficient to uniquely address each FC node within the arbitrated loop.

A loop initialization process may be undertaken by an FC node connected to an arbitrated loop topology for any of a variety of different reasons, including loop initialization following power up or a power reset of the FC node, subsequent inclusion of an FC node into an already operating FC arbitrated loop, and various error recovery operations. FC arbitrated loop initialization comprises seven distinct phases.

In the first phase of loop initialization, called "LISM," a loop initialization master is selected. This first phase of loop initialization follows flooding of the loop with loop initialization primitives ("LIPs"). All active FC nodes transmit an LISM FC arbitrated loop initialization frame that includes the transmitting FC node's 8-byte port name. Each FC port participating in loop initialization continues to transmit LISM FC arbitrated loop initialization frames and continues to forward any received LISM FC arbitrated loop initialization frames to subsequent FC nodes in the arbitrated loop until either the FC port detects an FC frame transmitted by another FC port having a lower combined port address, where a combined port address comprises the D_ID, S_ID, and 8-byte port name, in which case the other FC port will become the loop initialization master ("LIM"), or until the FC port receives back an FC arbitrated loop initialization frame that FC port originally transmitted, in which case the FC port becomes the LIM.

Once an LIM has been selected, loop initialization proceeds through an LIFA phase, in which any FC node having a certain type of assigned AL_PA can attempt to acquire that AL_PA. During this and subsequent loop initialization phases, the LIM transmits an FC arbitrated loop initialization frame that includes a 16-byte AL_PA bit map. The LIM sets a bit within the bit map corresponding to its assigned AL_PA, if the LIM has an assigned AL_PA. As this FC frame circulates through each FC port within the arbitrated loop, each FC node also sets a bit in the bit map to indicate that FC nodes fabric-assigned AL_PA, if that FC node has a fabric assigned AL_PA. If the data in the bit map has already been set by another FC node in the arbitrated loop, then the FC node must attempt to acquire an AL_PA during one of three subsequent group initialization phases.

In the LIPA loop initialization phase, the LIM transmits an FC frame containing the AL_PA bit map returned to the LIM during the previous LIPA phase of loop initialization. During the LIPA phase, the LIM and other FC nodes in the arbitrated loop that have not yet acquired an AL_PA may attempt to set bits within the bit map corresponding to a previously acquired AL_PA saved within the memory of the FC nodes. If an FC node receives the LIPA FC frame and detects that the bit within the bit map corresponding to that FC node's previously acquired AL_PA has not been set, the FC node can set that bit and thereby acquire that AL_PA.

The next two phases of loop initialization, LIHA and LISA are analogous to the above-discussed LIPA phase. Both the LIHA phase and the LISA phase employ FC frames containing bit maps from the previous phase, so that any FC port in the arbitrated loop that has not yet acquired an AL_PA may attempt to acquire either a hard assigned AL_PA contained in the port's memory, or, at last resort, may obtain an arbitrary, or soft, AL_PA not yet acquired by any of the other FC ports in the arbitrated loop topology. If an FC port is not able to acquire an AL_PA at the completion of the LISA phase, then that FC port may not participate in the arbitrated loop. The FC-AL-2 standard contains various provisions to enable a nonparticipating FC node to attempt to join the arbitrated loop, including restarting the loop initialization process.

In the LIRP phase of loop initialization 1912, the LIM transmits an FC frame containing a 128-byte AL_PA position map. The LIM places the LIM's acquired AL_PA, if the LIM has acquired an AL_PA, into the first AL_PA position within the AL_PA position map, following an AL_PA count byte at byte 0 in the data field, and each successive FC node that receives and retransmits the LIRP FC arbitrated loop initialization frame places that FC node's AL_PA in successive positions within the AL_PA position map. In the final loop initialization phase LILP, the AL_PA position map is recirculated by the LIM through each FC port in the arbitrated loop topology so that the FC ports can acquire, and save in memory, the completed AL_PA position map. This AL_PA position map allows each FC port within the arbitrated loop to determine its position relative to the other FC ports within the arbitrated loop.

Figure 3:
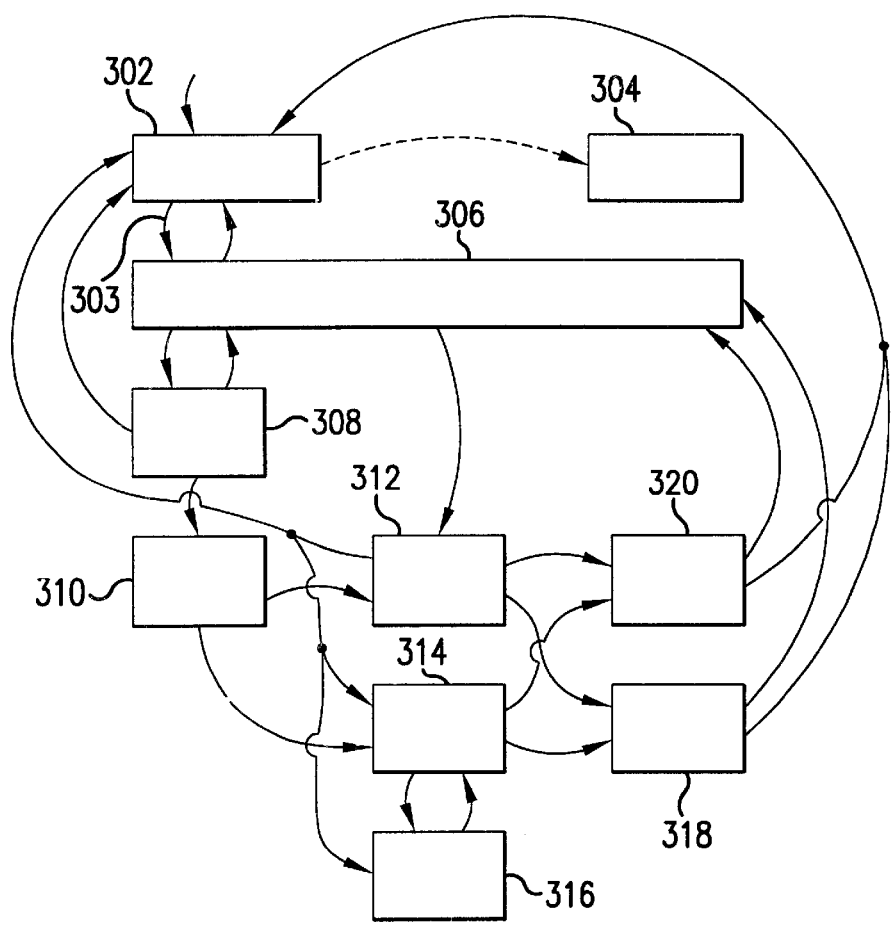
FIG. 3 shows a partial state diagram for an FC arbitrated loop node.

Once initialized, FC nodes transition to a monitoring state where they monitor various FC primitives and FC frames circulating around the FC arbitrated loop. Upon reception of certain FC primitives, an FC node may transition to various different states, and, in the process of transitioning from one state to another, an FC node may transmit additional FC primitives and FC frames. FC nodes implement a relatively complex, low-level-protocol driven state machine that allows the FC nodes to arbitrate for control of the FC arbitrated loop, open connections to other FC nodes, and exchange data. FIG. 3 shows a partial state diagram for an FC arbitrated loop FC node. The loop port state machine ("LPSM") includes 10 primary states, indicated in FIG. 3 by rectangles, such as rectangle 302, and various transitions between states indicated in FIG. 3 by curved arrows, such as transition 303.

Generally, transitions are invoked in a particular FC node by reception of one or more FC primitives or FC frames. In any particular state, an FC node may transmit some number of FC primitives and FC frames in order to effect subsequent state transitions in other FC nodes of an FC arbitrated loop. In the state diagram of the LPSM shown in FIG. 3, state 302 is the initialization state. It is in this state that an FC arbitrated loop node carries out the seven phases of FC arbitrated loop initialization previously described. Additional states include an Old-Port state 304, a monitoring state 306, an arbitrating state 308, an arbitration won state 310, an opened state 312, an open state 314, a transfer state 316, a transmitted closed state 318, and a received closed state 320. An FC node in the monitoring state monitors FC primitives and FC frame traffic through the FC arbitrated loop in order to detect FC primitives and FC frames that may cause the FC node to transition to one of the other states.

When the host of a first FC node initiates data transfer with a second FC node, the first FC node transitions to the arbitrating state 308 in which the first FC node transmits an FC arbitration primitive in an attempt to acquire control of the FC arbitrated loop. If this first FC node acquires control, then the first FC node transitions to the arbitration one state 310 in which the first FC node transmits an FC open primitive in order to establish a connection with the second FC node. Upon establishing the connection, the first FC node transitions to the open state 314 and then, in the transfer state 316, transfers data to, and receives data from, the second FC node. Following completion of data transfer, the first FC node transmits an FC close primitive and transitions to the transmitted closed state 318, and from the transmitted close state transitions back to the monitoring state 306. The full complexity of the low-level FC protocols and the state diagram representing the LPSM is beyond the scope of the present invention. However, it should be noted in the state diagram shown in FIG. 3 that there is a transition from almost every state of the LPSM back to the initialization state 302. These transitions are elicited by an FC node receiving a LIP. Thus, the low-level FC protocols currently support a return to the initialization state 302 from almost any state of the LPSM. An FC node also transitions to the initialization state 302 upon power up, detection of certain errors, and various other events that are conveniently handled by reinitializing the FC arbitrated loop. In general, data may be lost during reinitialization of the FC arbitrated loop. However, higher-level FC protocols detect such data loss and provide for data retransmission or, in the worst cases, for a return of various error codes to the host when the data loss cannot be handled by the FC protocol.

Because auto-speed negotiation is most conveniently accomplished during the initialization state, and because the FC protocols currently provide for a well-defined and robust reinitialization process in which all FC nodes automatically return to the initialization state, it is most convenient and most desirable to insert an auto-speed-negotiation function into the initialization state (302 in FIG. 3). However, the seven-phase FC arbitrated loop initialization process, discussed above, is relatively complex and involves a number of FC primitives and FC frames that have been carefully differentiated from the many FC primitives and FC frames transmitted and received by FC nodes in the many state transitions supported by the LPSM. For that reason, it is most desirable to insert the auto-speed-negotiation function into the initialization process without defining new FC primitives and FC frames and without unnecessarily perturbing the already complex FC arbitrated loop initialization procedure. In order for auto-speed-negotiation-capable FC nodes to coexist in an FC arbitrated loop with older, non-auto-speed-negotiation-capable FC nodes, it is imperative that the FC protocols not be perturbed in implementing the auto-speed-negotiation function.

Figure 4:
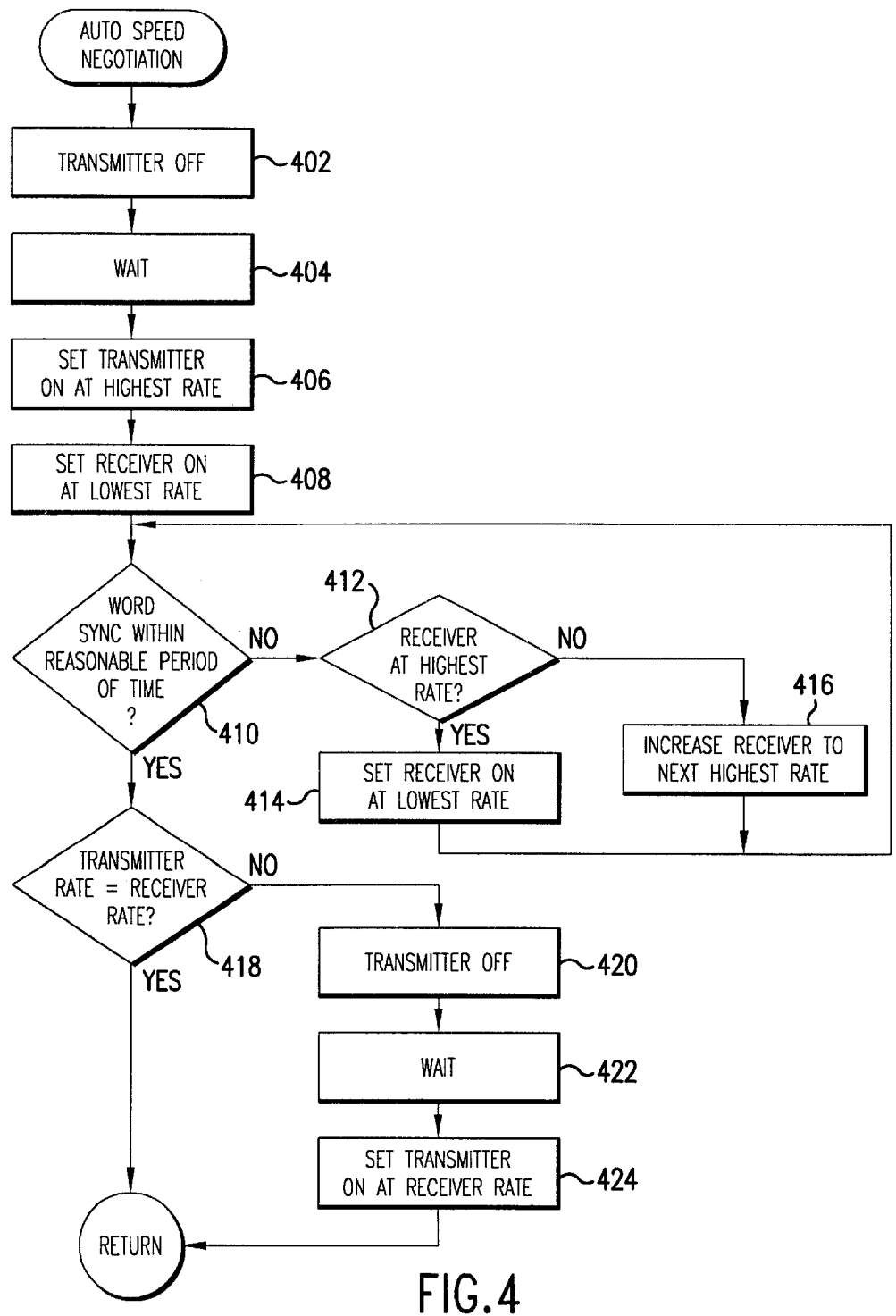
FIG. 4 is a flow control diagram representing an auto-speed-negotiation function that can be inserted into the first phase of the FC arbitrated loop initialization procedure.

FIG. 4 is a flow control diagram representing an auto-speed-negotiation function that can be conveniently inserted into the first phase of the FC arbitrated loop initialization procedure. This auto-speed-negotiation function allows auto-speed-negotiation function capable FC nodes in an FC arbitrated loop to automatically determine the highest common data transmission and reception rates among the FC nodes in the FC arbitrated loop. The auto-speed-negotiation function described in FIG. 4 depends on the following conditions. First, all the FC nodes in an FC arbitrated loop need to have at least one data transmission and reception rate in common. Second, auto-speed-negotiation-capable FC nodes need to be capable of independent control of their data transmission and reception rates. Finally, it is desirable that the FC nodes that implement the auto-speed-negotiation function be capable of detecting a loss of signal condition. Although not obligatory, this final condition ensures that the auto-speed-negotiation function is accomplished in a relatively short amount of time.

The auto-speed-negotiation function, described in FIG. 4, is invoked by an FC node at power up, upon detection of a loss of input signal, detection of a loss of word synchronization for greater than the period of time after which an R_T_TOV time out condition occurs within the FC node. The auto-speed-negotiation function may be invoked by an FC node in the first phase of arbitrated loop initialization, prior to transmission of LIPs. In step 402, the FC node turns its transmitter off. In step 404, the FC node waits for a period of time. This period of time must be sufficient for loss of signal detection to propagate through all remaining FC nodes on the FC arbitrated loop. The period of time may be fixed to a period of time adequate for loss of signal detection to propagate around the largest possible FC arbitrated loops, or may possibly be re-configurable or manually set by an FC arbitrated loop administrator. Note that, when a first FC node undertakes auto-speed negotiation, the next FC node in the arbitrated loop will detect loss of signal after some short period of time, generally less than 100 microseconds. Upon detection of loss of signal, the next FC node then begins the initialization process and invokes the auto-speed-negotiation function, turning its transmitter off. Thus, detection of loss of signal propagates around the FC arbitrated loop causing each FC node in the FC arbitrated loop to begin the auto-speed-negotiation function.

After waiting for a sufficient time for loss of signal detection to propagate completely around the FC arbitrated loop, the FC node turns its transmitter back on and sets the transmitter at the transmitter's highest data transmission rate in step 406. Next, in step 408, the FC node sets the data reception rate of its receiver to the receiver's lowest data reception rate. Then, in step 410, the FC node waits for detection of word synchronization by the receiver component of the FC node's transceiver. If word synchronization is not detected within a reasonable period of time (one millisecond in one embodiment) in step 410, then, in step 412, the FC node determines whether the receiver component is currently set to the highest data reception rate. If the receiver component is currently set to the highest data reception rate, then, in step 414, the FC node sets the receiver's data reception rate to the lowest data reception rate and returns to step 410 to again await word synchronization. If the data reception rate of the receiver is currently below the receiver's highest possible data reception rate, then the FC node increases the data reception rate of the receiver to the receiver's next highest data reception rate in step 416 and returns to step 410 to again await word synchronization.

When word synchronization is achieved, the FC node determines whether the current data transmission rate of its transmitter component is equal to the current data reception rate of the FC node's receiver component in step 418. If so, then auto-speed negotiation is finished and returns. Otherwise, the FC node turns its transmitter off in step 420, waits for a sufficient time for loss of signal to propagate throughout all FC nodes of the FC arbitrated loop in step 422, and then sets its transmitter back on at a data transmission rate equal to the current rate of data reception of the FC node's receiver component in step 424. Steps 420–424 thus invoke a next round of auto-speed negotiation. In general, two rounds of auto-speed negotiation are adequate for all auto-speed-negotiation-capable FC nodes of an FC arbitrated loop to converge on a maximum common data transmission and reception rate.

Although the present invention has been described in terms of a particular embodiment, it is not intended that the invention be limited to this embodiment. Modifications within the spirit of the invention will be apparent to those skilled in the art. For example, the auto-speed-negotiation function may be inserted at different points within the FC arbitrated loop initialization procedure. The time during which an FC node turns off its transmitter in order to cause the next FC node in the arbitrated loop to detect loss of synchronization and to therefore invoke the next FC node's auto-speed-negotiation function, may be fixed to a period of time adequate for loss of signal synchronization to propagate through the maximum number of FC nodes that can be accommodated in an FC arbitrated loop. Alternatively, this transmitter-off period may be manually set by an FC arbitrated loop administrator, or may be automatically determined based on previous performance of the initialization procedure for an FC arbitrated loop. Additional steps may be added to the auto-speed-negotiation routine in order to guarantee convergence by the FC nodes in an FC arbitrated loop on a negotiated data transmission and reception rate after some maximum allowable time or after some maximum number of iterations. The auto-speed-negotiation function is generally implemented as logic circuits within an interface controller or possibly within a transceiver chip. An almost limitless number of different implementations of the auto-speed-negotiation routine diagramed in FIG. 4 are possible. Alternatively, the auto-speed-negotiation function may be implemented in firmware or in software routines.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

What is claimed is:

1. A method for conducting automated transmission and reception speed negotiation within a fibre channel port of a fibre channel node in a fibre channel arbitrated loop, the method comprising:
   turning off a transmitter of a transceiver component of the fibre channel port;
   waiting for a first period of time;
   turning on the transmitter of the transceiver component of the fibre channel port and setting the transmitter's data transmission rate to a high data transmission rate;
   setting a data reception rate of a receiver of the transceiver component to a low data reception rate;
   iteratively
      waiting to detect word synchronization by the receiver of the transceiver component, and, when word synchronization is not detected within a second period of time, setting the data reception rate of the receiver of the transceiver component to a different data reception rate
   until word synchronization is detected;
   determining whether the data transmission rate is equal to the data reception rate immediately following word synchronization, and, if the data transmission rate is not equal to the data reception rate immediately following word synchronization,
      turning off the transmitter of the transceiver component of the fibre channel port;
      waiting for a third period of time; and
      turning on the transmitter of the transceiver component of the fibre channel port and setting the data transmission rate of the transmitter to the data reception rate of the receiver of the transceiver component.

2. The method of claim 1 wherein both the first period of time and the third period of time are equal to the time required for loss of signal detection to propagate through all other fibre channel nodes in the fibre channel arbitrated loop.

3. The method of claim 1 wherein both the first period of time and the third period of time are equal to the time required for loss of signal detection to propagate through one less than the maximum number fibre channel nodes that can be active in a fibre channel arbitrated loop.

4. The method of claim 1 wherein the second period of time is one millisecond.

5. The method of claim 1 wherein setting the transmitter's data transmission rate to a high data transmission rate further includes setting the data transmission rate of the transmitter to a highest data transmission rate at which the transmitter is capable of transmitting data.

6. The method of claim 1 wherein setting a data reception rate of a receiver of the transceiver component to a low data reception rate further includes setting the data reception rate of the receiver to a lowest data reception rate at which the receiver is capable of receiving data.

7. The method of claim 1 wherein the method is carried out by the fibre channel port following detection of a loss of signal by the receiver of the transceiver component of the fibre channel port.

8. The method of claim 1 wherein the method is carried out by the fibre channel port following detection of a loss of word synchronization by the receiver of the transceiver component of the fibre channel port for a period of time that causes a fibre channel R_T_TOV timeout condition to occur within the fibre channel port.

9. The method of claim 1 wherein the method is carried out by the fibre channel port as a part of the fibre channel arbitrated loop initialization procedure.

10. A fibre channel node that includes a fibre channel port that carries out the method of claim 1 following detection of a loss of signal by the receiver of the transceiver component of the fibre channel port and following detection of a loss of word synchronization by the receiver of the transceiver component of the fibre channel port for a period of time that causes a fibre channel R_T_TOV timeout condition to occur within the fibre channel port.

* * * * *